United States Patent Office 3,674,453
Patented July 4, 1972

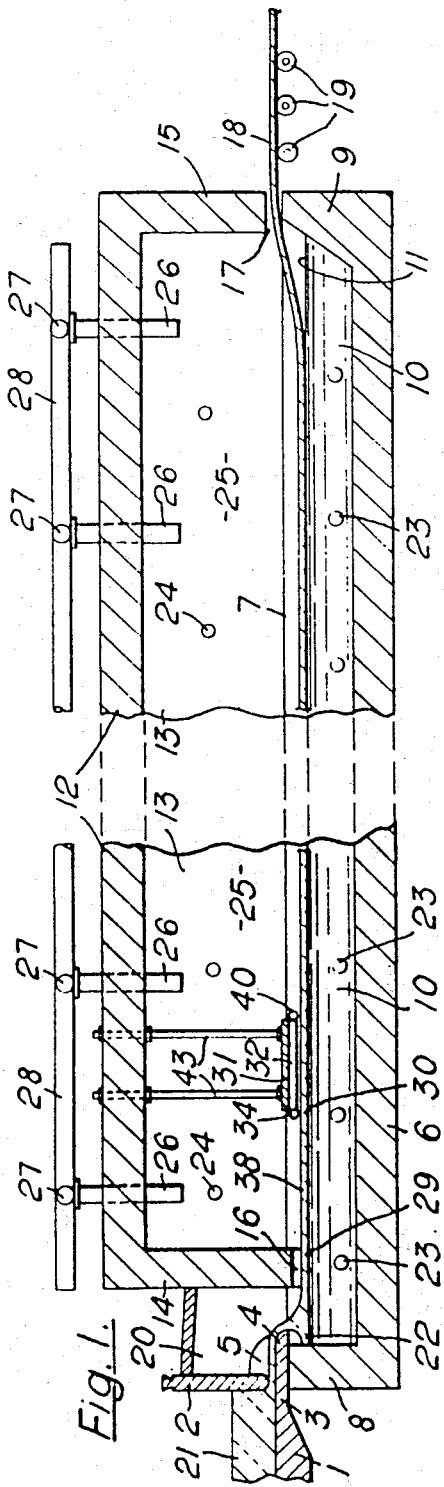
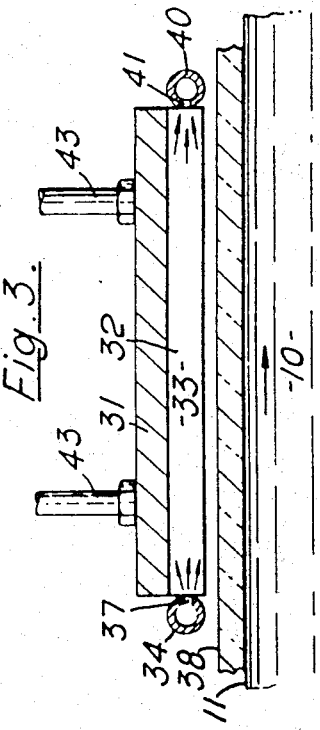
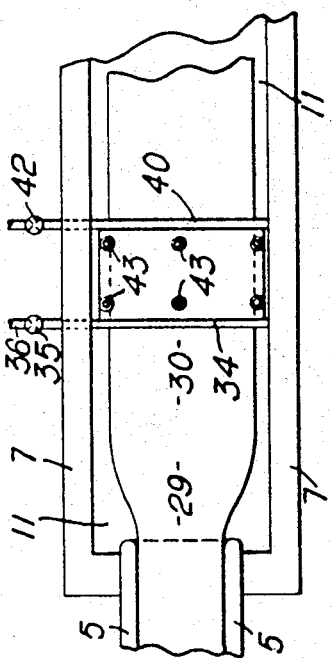

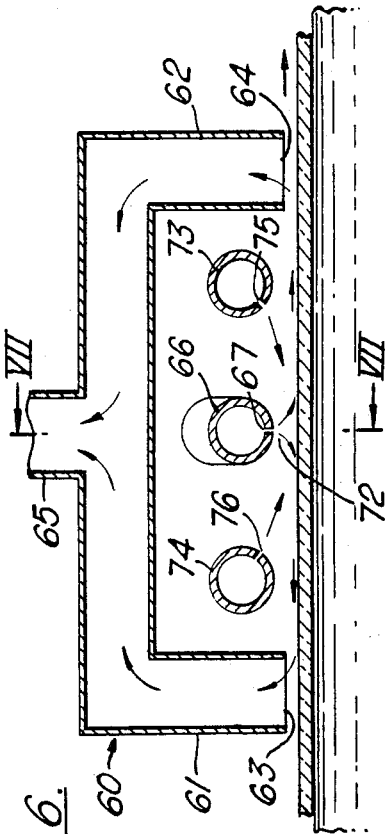
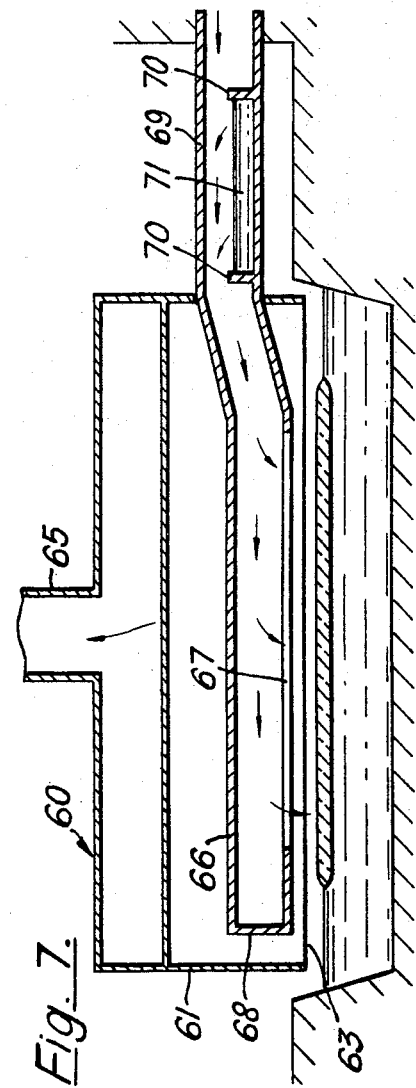

3,674,453
PRODUCTION OF FLOAT GLASS HAVING AN OXIDIZED METAL-MODIFIED SURFACE
David Gordon Loukes, Eccleston Park, and Alan Edwards, Widnes, England, assignors to Pilkington Brothers Limited, Liverpool, England
Filed Aug. 5, 1969, Ser. No. 847,629
Claims priority, application Great Britain, Aug. 16, 1968, 39,367/68
Int. Cl. C03c 17/00; C03b 19/00
U.S. Cl. 65—30         10 Claims

ABSTRACT OF THE DISCLOSURE

Desired characteristics, for example a desired colour, are imparted to float glass by the dissolving of a metal oxide as a uniform and continuous surface stratum in a face of the glass by directing a metal compound in vapour form on to the hot glass surface under oxidising conditions such that oxidation is promoted only at the glass surface resulting in solution of metal oxide into a surface layer of the glass.

BACKGROUND OF THE INVENTION

This invention relates to the production of glass having desired surface characteristics.

The invention is based on the discovery that by exposing a hot glass surface under oxidising conditions to a metal compound in vapour form, the glass promotes oxidation of the metal compound at the glass surface and a desired surface finish is imparted to the glass by solution of an oxidation product into the glass surface.

It is a main object of the present invention to employ this discovery in the production of glass having desired surface characteristics, for example a desired surface colouration.

SUMMARY

According to the invention a method of producing glass having desired characteristics, in which the glass is thermally conditioned to a temperature at which it is susceptible to surface modification, is characterised by directing a metal compound in vapour form on to the hot glass surface, under oxidising conditions, and regulating the oxidising conditions to promote oxidation of the metal compound at the glass surface producing a metal oxide which is dissolved into a surface layer of the glass.

The oxidising conditions are preferably regulated so that there is little or no reaction between the metal compound vapour and oxidising gas before that metal compound vapour reaches the glass surface.

The oxidation of the metal compound vapour is promoted by the glass surface which can be said to disturb the state of equilibrium existing between the metal compound vapour and the oxidising gas by dissolving metal oxide into its surface and thereby promoting oxidation of the metal compound at the glass surface and solution of the resulting metal oxide into the glass surface.

In one embodiment of the invention the metal compound vapour may be produced in situ near the glass surface and such a method is characterised by supporting a body of a metal for treating the glass in proximity to the glass surface to be treated, and directing a reactive gas across that body thereby releasing a vapour of a compound of that metal adjacent the glass surface. The reactive gas may be a gaseous halogen or chalkogen. For example the reactive gas may be chlorine or sulphur.

Preferably according to the invention the metal employed for modifying the surface characteristics of the glass is sodium, potassium, antimony, bismuth, lead, tin, copper, cobalt, manganese, chromium, iron, nickel, silver, silicon or titanium.

The invention has been found to be particularly effective for the production of a uniformly coloured layer of dissolved oxide in the surface of the glass and from this aspect the invention provides a method characterised in that the element is cobalt, copper or manganese and the dissolved metal oxide produces the uniformly coloured layer in the glass.

The presence of a trace of oxygen in the gas flow to which the hot glass surface is exposed is usually sufficient to promote the oxidation of the gaseous compound at the glass surface which results in the migration of an element in the form of its oxide into the glass surface thereby producing the desired colouration of the surface.

As well as the control of this migration effected by regulating the concentration of gaseous compound adjacent the glass surface, additional control may be afforded by regulating the oxidising conditions. The oxidising gas may be oxygen, water vapour or carbon dioxide. Preferably according to the invention the gaseous flow directed across the body of the element comprises from 5% to 10% chlorine, the remainder being nitrogen. From 0.00001% to 6% oxygen may be present in the atmosphere above the glass into which flows the compound of the element in vapour form. The body of the element may be heated or cooled to regulate the rate of production of the gaseous compound. Thermal regulation is also advantageous for controlling the vapour pressure of the element when the element is volatile, e.g. sodium or potassium.

It will be understood that the reference to oxidising conditions is to be read in the broadest chemical sense as exemplified by reference to oxygen or sulphur.

Alternatively according to the invention when the element is sodium, potassium, antimony, bismuth, lead, tin or silicon, the reactive gas may be oxygen.

Flat glass to which a desired surface finish is to be imparted is preferably supported on a molten metal surface so that the surface treatment can be carried out at a high temperature, for example up to 950° C., without impairing the fire-finish and distortion-free quality of the surfaces of the flat glass.

The method may be applied to flat glass either in sheet form, which sheets are advanced individually along the molten metal surface and beneath an enclosure in which the treatment with a compound in gaseous form under oxidising conditions takes place. Alternatively flat glass may be advanced along the bath in continuous ribbon form by the well known float process in which a ribbon of glass is produced on a molten metal surface from molten glass delivered to the surface at one end of a bath of molten metal to establish a layer of molten glass on the bath. The glass in the layer is advanced partly by momentum and partly by traction effort directed longitudinally of the ribbon developed from the layer, so that the molten glass fed to the bath is converted into continuous ribbon form and advanced under conditions such that it can be removed from the bath without harm to the glass. In the application of the invention to the float process it is preferable to apply the glass flow against the upper surface of the ribbon of glass in a region of the ribbon where the temperature of the glass is above 600° C. Usually the invention is applied in that part of the bath termed the hot end of the bath where the temperature of the glass is in the range 800° C. to 950° C.

The bath of molten metal may be a bath of molten tin or an alloy of tin in which tin predominates, and a protective atmosphere which is maintained over the bath of molten metal usually contains a reducing constituent, for example a percentage of hydrogen. The gas flow which is directed adjacent the glass surface as it advances through the treatment zone is isolated from the protective atmosphere over the bath of molten metal so as to avoid reaction of the salt vapour with the exposed surface of the molten metal bath.

After leaving the treatment zone the treated surface of the float glass is exposed to the reducing atmosphere while the glass is still hot.

The reduction of the modified glass surface, for example by hydrogen in the atmosphere over the float bath, develops or modifies the colour of the treated glass surface.

When reduction of the treated glass surface is not required an inert protective atmosphere, e.g. a nitrogen atmosphere, is maintained in the headspace over the bath of molten metal.

The invention also comprehends apparatus for producing glass having desired characteristics by a method as hereinbefore described comprising a tank structure containing a bath of molten metal over which a protective atmosphere is maintained, means for delivering glass to the bath and advancing the glass along the bath at a controlled rate, and thermal regulators for maintaining the temperature of the glass sufficiently hot to be susceptible to surface modification, characterised by an open-bottomed enclosure mounted just above the path of travel of the glass to delimit a treatment zone above the glass separated from the protective atmosphere, means within the enclosure for supplying a metal compound in vapour form on to the hot glass surface, means for maintaining oxidising conditions within the enclosure and means for exhausting spent vapours from the enclosure.

In a preferred apparatus according to the invention a bar comprising an element for treating the glass is fixed to the tank structure and is mounted just above and extends across the path of travel of the glass along the bath, which bar is shaped to define said enclosure, gas supply means is mounted along one edge of the enclosure and is directed so as to supply a gas flow in proximity to the glass surface and the interior surface of the bar, and gas exhaust means is mounted along the opposite edge of the enclosure.

The gas supply means is arranged so that there is reaction of the reactive gas with the material of the bar and the gaseous compound resulting from that reaction is carried in admixture with oxidising gas on to the glass surface to be treated as it flows in the general direction of the gas flow within the enclosure towards the gas exhaust means.

In one embodiment of the invention the bar is a composite bar, the upstream part of which is made of a metal to be used in treating the glass, the downstream part of which is made of an inert refractory material and is formed with a slot-shaped outlet connected to a gas supply for delivering oxidising gas into the enclosure, and the gas supply means is mounted along the edge of the upstream part of the bar.

In another embodiment of apparatus according to the invention employing a metal of lower melting point the enclosure is formed by a refractory hood fixed over a refractory boat for containing molten metal, which boat and hood extend across the path of travel of the ribbon of glass, an outlet for reactive gas is provided within the hood adjacent the open top of the boat, and a leg of the hood extends downwardly near to the bath surface to direct metal compound vapour on to the ribbon surface.

Metal compound vapour may be engendered in the duct which supplies the vapour on to the glass surface and in order to do this in another embodiment of apparatus according to the invention the enclosure is of inverted U-section with walls of hollow section which are open at their bottom edges to define extraction slots at the upstream and downstream limits of the treatment zone within the enclosure, the hollow section of the hood is connected to gas extraction means, and slotted supply ducts are mounted across the bath surface within the enclosure, one supply duct being connected to means for generating metal compound vapour, and at least one other duct being connected to oxygen supply means, the ducts being oriented so that their slots point to a treatment region on the glass surface.

In a preferred form of this embodiment the slotted supply duct for metal compound vapour includes, at one side of the bath, an internal boat for containing molten metal, over which reactive gas is supplied to generate metal compound vapour which is swept along the duct.

The invention also includes glass having desired surface characteristics produced by a method as hereinbefore described for example float glass, glass articles for example glass sheets whether flat or curved, articles of pressed ware such as hollow glass blocks, electrical insulators and television tube face plates, and rolled glass for example patterned rolled glass and rolled glass sections for use as building elements.

Glass products according to the invention can further be defined as glass having a continuous film of metal oxide dissolved in its surface and produced by a method as hereinbefore described.

BRIEF DESCRIPTION OF THE DRAWINGS

FIG. 1 is a sectional elevation, by way of example, of apparatus according to the invention as applied to the float process in which an enclosure for treatment of the upper surface of an advancing ribbon of glass is mounted in the tank structure above the surface of the bath of molten metal contained in the tank structure;

FIG. 2 is a plan view of the hot end of the tank structure with the roof structure removed;

FIG. 3 is a detailed view of part of FIG. 1 showing in greater detail the enclosure with gas supply and exhaust means mounted just above the path of travel of the ribbon of glass;

FIG. 6 is a section through yet another apparatus according to the invention which is suitable for use with low melting point metals; and FIG. 7 is a section on line VII—VII of FIG. 6.

In the drawings like references indicate the same or similar parts.

DESCRIPTION OF THE PREFERRED EMBODIMENTS

Figure 4:
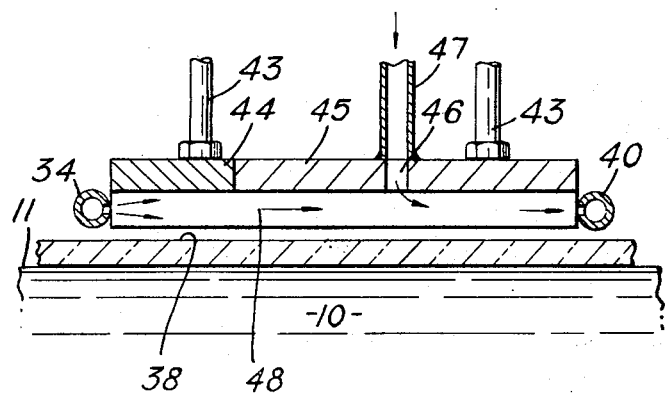
FIG. 4 illustrates a modification of the apparatus of FIG. 3.

Referring to the drawings, a forehearth of a continuous glass melting furnace is indicated at 1 and a regulating tweel at 2. The forehearth ends in a spout 3 comprising a lip 4 and side jambs 5 one of which is shown in FIG. 1. The lip 4 and side jambs 5 together constitute the spout of generally rectangular cross-section. The spout 3 is disposed above the floor 6 of an elongated tank structure including integral side walls 7, and end walls 8 and 9. The tank structure holds a bath 10 of molten metal whose surface level is indicated at 11. The bath is for example a bath of molten tin or of a molten tin alloy in which tin predominates and which has a specific gravity greater than that of the glass.

A roof structure is supported over the tank structure and includes a roof 12, integral side walls 13 and integral end walls 14 and 15 respectively at the inlet and outlet ends of the tank structure. The inlet end wall 14 extends downwardly close to the surface 11 of the molten metal at the hot end of the bath to define with that surface an inlet 16 which is restricted in height and through which molten glass is advanced as described below.

The outlet end wall 15 of the roof structure defines with the outlet end wall 9 of the tank structure an outlet 17 through which the ultimate ribbon of glass 18 produced is discharged on to driven conveyor rollers 19 mounted outside the outlet end of the tank structure and disposed somewhat above the level of the top of the end wall 9 of the tank structure so that the ribbon of glass 18 is lifted clear of the wall 9 for discharge unharmed through the outlet 17.

The rollers 19 convey the ribbon of glass 18 to an annealing lehr, not shown, in well known manner and also apply tractive effort longitudinally of the ribbon of glass to assist in the advancing of the ribbon as it glides along the surface of the bath.

An extension 20 of the roof structure extends up to the tweel 2 and forms a chamber in which the spout 3 is disposed.

Molten soda-lime-silica glass 21 is poured on to the bath 10 of molten metal from the spout 3 at a controlled rate and the momentum of the glass as it is poured on to the bath advances the glass along the bath. The tweel 2 regulates the rate of flow of the molten glass 21 over the spout lip 4 and this lip is spaced vertically from the surface 11 of the bath by a distance of a few inches so that there is a free fall of the molten glass through that distance, which is exaggerated in FIG. 1 for the sake of clarity.

This free fall is sufficient to ensure the formation of a heel 22 of molten glass behind the glass 21 pouring over the spout which heel extends back to the inlet end wall 8 of the tank structure.

The temperature of the glass as it is advanced along the bath is regulated from the inlet end down to the discharge end by temperature regulators 23 immersed in the bath and temperature regulators 24 mounted in the headspace 25 defined by the roof structure over the bath. A protective gas for example a reducing gas containing a percentage of hydrogen, e.g. 3% to 5% hydrogen is supplied to the headspace through ducts 26 which are connected by branches 27 to a header 28 which is connected to a gas supply means. A plenum of protective gas is maintained in the substantially closed headspace 25 and there is outward flow of protective gas through the inlet 16 and the outlet 17 from the headspace thereby inhibiting the entry of ambient atmosphere into the headspace over the bath.

The temperature of the molten glass 21 delivered to the bath is regulated so as to ensure that a layer of molten glass 29 is established on the bath. This layer has momentum to cause its advance through the inlet 16 and during this advance there is unhindered lateral flow of the molten glass under the influence of surface tension and gravity until there is developed on the bath surface from the layer 29 a buoyant body 30 of molten glass which is then advance in ribbon form along the bath under the action of the tractive effort applied to the ultimate ribbon 18 by the driven conveyor rollers 19. As shown in FIG. 2 the width of the tank structure at the surface level of the bath is greater than the width of the buoyant body so that there is no limitation to the initial free lateral flow of the molten glass.

Near the hot end of the bath where the glass is being advanced in the form of the buoyant body 30 in ribbon form and the temperature of the glass is in the range 800° C. to 950° C. there is mounted a bar 31 of the element which is to be employed to modify the surface characteristics of the upper face of the advancing ribbon of glass. The bar 31 is of shallow U-channel section, having down-turned flanges 32 at its ends, and the bar is mounted so that the bottom faces of the flanges are spaced just above the upper surface of the margins of the advancing ribbon of glass. The bar thus defines an open-bottomed enclosure which is mounted just above the path of travel of the ribbon of glass.

The enclosure is indicated by the refernce 33, FIG. 3, and at its upstream edge is closed by a gas supply duct 34 which extends right across the tank structure between the side walls 7. One end of the duct 34 is closed and is fixed to one of the side walls 7, while the other end of the supply duct 34 extends through the opposite side wall 7 and is connected through a regulating valve 35 to a duct which is connected to a supply of a reactive gas, for example chlorine, which is mixed with an oxidising gas, for example oxygen, for producing controlled oxidising conditions. The gas supply duct 34 is, for example, constituted by a silica tube in which there is cut a slot shaped outlet 37 extending along the tube and which directs the gas flow into the whole width of the enclosure in proximity to both the upper face 38 of the glass being treated and the interior face 39 of the metal bar 31 which face 39 forms the roof of the enclosure 33.

At its downstream edge the enclosure 33 is closed by a gas exhaust duct 40 constituted by a silica tube which is mounted in similar manner to the duct 34, and has a slot shaped extract outlet 41 extending over the whole width of the enclosure. The duct 40 is connected to a regulating valve 42 and then to extract means which applies a negative pressure to the duct 40.

The bar 31 is suspended from the roof 12 by hanger bolts 43 which are shown diagrammatically as passing upwardly through the roof 12. The hanger bolts 43 may be fixed into a water cooled beam forming a part of the roof structure, and additionally there may be cooling channels formed in the bar 31 enable the temperature of the bar to be regulated independently of the temperature exisiting in the region of the headspace 25 where the bar is suspended.

The supply to the duct 34 is a regulated supply of gaseous halogen for example chlorine and in order to provide desired oxidising conditions there is, in this example, at least a trace of oxygen mixed in with the chlorine. Chlorine may be supplied as a mixture with an inert gas and with oxygen, for example 5% chlorine, 0.5% oxygen and 94.5% nitrogen. The oxygen content may be in the range 0.00001% to 6% by volume of the gas supplied.

In order to produce a blue colour in the glass, the bar 31 is a cobalt bar. The gaseous mixture released through the slot shaped outlet 37 is directed across the interior surface 39 of the bar 31. The chlorine in the gas reacts with the cobalt surface and cobalt chloride is formed and is carried in proximity with the glass surface in the general direction of flow of the gas stream through the enclosure. The upper face 38 of the glass passing beneath the enclosure 33 is thus exposed to cobalt chloride vapour under oxidising conditions. The constitution of the gases beneath the bar 31 is such that no oxidation takes place until the mixed gases contact the glass surface which promotes oxidation of the cobalt chloride vapour by dissolving the resulting cobalt oxide in the glass surface.

Solution of cobalt in the form of cobalt oxide, from this vapour into the glass surface takes place as the glass passes beneath the enclosure, and spent gases are sucked through the slot 41 into the exhaust duct 40.

The dissolving of cobalt into the glass surface 38 is controlled by regulating the gas flow to the enclosure and hence the concentration of gaseous cobalt chloride in the enclosure 33 adjacent the glass surface, by means of the valve 35 and the valve 42. By increasing the rate of flow of the active gaseous halogen across the metal surface within the enclosure the depth of treatment of the glass surface is increased, it being found that the strength of colouration of the glass surface by a metal depends on the rate of flow of gaseous metal compound under oxidising conditions in immediate proximity with the glass surface.

The solution of the cobalt oxide into the glass surface results in a continuous and uniformly coloured surface stratum of the glass with an absence of oxide particles.

The chlorination of the surface of the bar mounted across the ribbon and closely adjacent the glass surface ensures that the treatment of the glass is uniform over the whole width of the advancing glass beneath the open-bottomed enclosure 33, the whole of the glass being subjected to the same treatment conditions which are uniform across the glass within the enclosure 3 beneath which the glass passes.

When the cobalt blue colour so produced is to be retained in the glass, the atmosphere over the bath to which atmosphere the cobalt oxide-rich surface is exposed is a nitrogen atmosphere without a reducing constituent. A blue-grey colour is produced by reduction of some of the cobalt oxide in the glass surface to colloidal cobalt by introducing a small percentage, e.g. 1%, of hydrogen into the protective atmosphere supplied to the headspace over the bath through the ducts 26.

Up to 10% of chlorine in the gaseous flow to the enclosure has been successfully used, and a trace only of oxygen may be necessary to produce the desired oxidising conditions, for example 100 to 500 volumes per million of oxygen or water vapour in the gaseous atmosphere supplied into the enclosure.

Additional control of the colouration produced is achieved by varying the oxidising conditions and an intense cobalt blue colour is produced in float glass with the 6% concentration of oxygen by volume in the gaseous atmosphere.

FIG. 4 illustrates a modification of the apparatus of FIG. 3 in which oxygen does not come into contact with the metal bar.

The enclosure is formed by a composite bar, the first part 44 of which is of the metal, e.g. cobalt to be used in treating the glass, which is fixed to a second part 45 of an inert refractory material, through which there is formed a slot-shaped inlet 46, connected to a gas supply nozzle 47.

Pure chlorine is supplied through the duct 34 and reacts with the cobalt bar 44 adjacent the glass surface to produce a downstream flow 48 of cobalt chloride. Oxygen is supplied through the nozzle 47 in a proportion below that which would react with the cobalt chloride vapour under the conditions prevailing above the glass. Oxidation takes place at the glass surface beneath the inlet 46 to cause solution of cobalt oxide into the glass surface. Any tendency to production of oxides on the metal bar is thereby avoided.

Other elements which have been successfully employed for the surface modification of the glass by the method of the invention are copper, iron, manganese and chromium all of which produce their distinctive colours in the glass in the form of uniform continuous surface stratum in the glass. For example with cuprous chloride vapour formed in situ by employing a bar 31 of copper and an atmosphere similar to that used with the cobalt bar a beautiful blue-green colour is produced with an inert nitrogen atmosphere in the headspace 25. A copper-bronze-red colour is produced when there is hydrogen in the headspace. A surface layer of silicon, or titanium can also be introduced into the glass in this way to produce desired reflection/transmission effects.

Experiments also showed that when using a silver bar 31, silver chloride is formed and appreciable amounts of silver ions migrate into the glass by the ionic exchange which occurs with the gaseous silver chloride flowing in proximity to the glass surface. Similarly a gold film can be produced this way in the glass surface which has the advantage of achieving a durable and solar energy rejecting gold film in one face of the glass.

Figure 5:
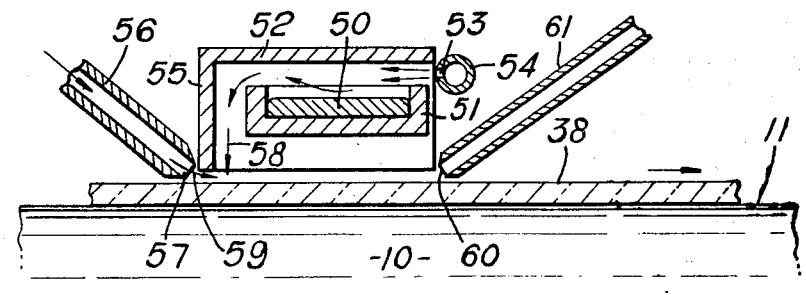
FIG. 5 is a view similar to FIG. 3 of an alternative embodiment of the invention for use with metals which are molten at the temperature of operation.

FIG. 5 illustrates another embodiment of the invention for use when the element to be used in treating the glass is molten at the temperature of the glass. Such metals are, for example, sodium, potassium, antimony, bismuth, tin and lead.

A body of the molten element 50, e.g. molten tin, is contained in a boat 51 of refractory material and of elongated shape which extends across the tank structure, between the side walls 7, above the surface 11 of the molten metal bath. The molten metal is thus contained, with a free surface closely adjacent the glass surface to be treated.

A refractory hood 52 of L-shaped section is fixed between the side walls 7 over the boat 51, leaving a clearance space above the boat for the flow of reactive gas supplied into that space from a slot-shaped outlet 53 in a silica tube 54 to which reactive gas is supplied. The leg 55 of the hood 52 extends downwardly near to the upper surface 38 of the glass ribbon being treated, and a flat, gas supply nozzle 56, having a slot-shaped outlet 57 is mounted just in front of the foot of the leg 55. Oxidising gas is supplied to the nozzle 56 and mingles with vapours descending from the hood, at the glass surface just downstream of the leg 55. Spent gases are sucked through a slot 60 in an exhaust duct 61 mounted near the glass surface at the downstream edge of the hood.

The reactive gas supplied to the silica tube 54 is a mixture of 5% chlorine and 95% nitrogen, and this gas flows across the surface of the molten tin 50. Stannic chloride vapour is produced and has a short downward flow as indicated at 58, inside the leg 55 of the hood, which is at the same temperature as the flowing vapour. A mixture of 1% oxygen with 99% nitrogen is supplied to the nozzle 56, and flows, as indicated at 59, beneath the foot of the leg 55 to provide controlled oxidising conditions above the region of the glass surface where the stannic chloride flow 58 is continuously contacting the glass surface moving forwardly beneath the foot of the leg 55. Reaction of stannic chloride with oxygen in this region results in the production of a surface layer of stannic oxide in the glass, which gives the glass surface electrically conducting properties.

In another example the reactive gas is oxygen which is supplied to the tube 54 at a low concentration mixed with nitrogen in the proportions 0.1% oxygen and 99.9% nitrogen. Stannous oxide vapour is produced and flows downwardly towards the glass surface. A strongly oxidising mixture of 10% oxygen with 90% nitrogen is fed through the nozzle 56. The stannous oxide vapor is oxidised to stannic oxide at the glass surface resulting in an electrically conductive surface film of stannic oxide in the glass.

FIGS. 6 and 7 illustrative yet another embodiment of the invention for use when a low melting point metal is to be employed for treating the glass surface, for example sodium, potassium, antimony, bismuth, tin or lead. The enclosure is formed by a hood of inverted U-section indicated generally by the reference 60. The walls of the hood are of hollow section with a passage between the walls. Each of the hollow section side walls respectively 61 and 62 is open at its bottom edge 63 and 64 to define extraction slots at the upstream and downstream limits of the treatment zone within the enclosure. The hollow passage through the hood is connected to a gas extraction duct 65 at the top of the hood which duct is connected to gas extraction means. The hood is, as before, made of an inert refractory material.

A slotted supply duct 66 formed by a silica tube having a slot 67 is mounted across the surface of the ribbon of glass with the slot 67 pointing downwardly towards the glass surface. The tube 66 is closed at one end 68 and at its other end the tube slopes upwardly to an inlet part 69 which is within the headspace defined by the roof structure over the bath of molten metal and is formed with internal walls 70 which define an internal boat for containing a body of molten metal 71, for example a body of molten tin. The part 69 of the duct extends outwardly through the side walls 7 and is conected to a supply of reactive gas for example for the kind supplied to the silica tube 54 in the embodiment of FIG. 5. Metal vapour for example tin chloride vapour, is discharged through the slot 67 towards the surface of the ribbon of glass as indicated at 72.

On either side of the central duct 66 within the extraction hood there are silica tubes respectively 73 and 74 for supplying oxidising gas for example a mixture of 1% oxygen with 99% nitrogen. Slots in these tubes 73 and 74 are indicated at 75 and 76 and they point inwardly to direct the oxidising gas to the region of the glass surface which is being contacted by the gaseous metal chloride released from the slot 67. Oxidation of the metal chloride takes place only at the glass surface, being promoted by the solution of the resulting oxide into the glass surface to produce in the glass surface the desired surface modified layer which is continuous and uniform across the whole surface of the glass.

It is not essential that the metal compound in vapour form should be generated either adjacent the glass surface as in the embodiments of FIGS. 1 to 5 or within the headspace over the bath of molten metal as in the embodiment of FIGS. 6 and 7. Indeed the metal compound vapour may be supplied from a source of supply outside the tank structure, as long as the supply means is sufficiently heated to prevent condensation of that vapour during its transit. It will be appreciated that in all embodiments of the present invention, the vapour of the metal compound and the oxidising agent in the treatment zone are maintained in a non-destructive relationship with respect to the protective atmosphere, i.e. the protective atmosphere will not interfere with the function of the vapour and oxidising agent and the vapour and oxidising agent will not interfere with the function of the protective atmosphere. In cases where the metal to be employed is molten at the temperature subsisting in the headspace over the bath of molten metal it is generally more convenient however to employ the apparatus of FIGS. 6 and 7 because no additional heating means is necessary either for maintaining the metal molten or for preventing condensation of metal compound vapours on their way to the glass surface.

The bar 31 of the molten metal body may be of an alloy, for example a cobalt/chromium alloy, resulting in a blue-green colouration of the glass.

In another modification a body of molten metal which is to enter the glass clings to a downwardly facing inert material; for example a molten body of lead or a sodium/bismuth alloy, clings to a ruthenium bar adjacent the glass surface, and the reactive gas is directed across the molten body.

The method of the invention can also be applied to the modification of glass of other compositions for example glass containing a proportion of iron, e.g. 0.5% iron.

Sheets of glass can be treated by the method of the invention by advancing those sheets along the molten metal surface beneath the enclosure by means of driven fingers engaging edges of the sheets. Where it is possible to treat the glass at a lower temperature at which the glass is unharmed by contact with mechanical conveyors the glass in ribbon or sheet form may be supported on a roller conveyor for advance beneath the enclosure. Glass of higher viscosity characteristics than soda-lime-silica glass can be treated on a roller conveyor but equally well can be treated on a bath of molten metal as the glass is continuously advanced in ribbon form in its manufacture by the float process. Pure silica glass can be treated by the oxidised method at very high temperatures for example above 1200° C.

By this method a surface colouration of the glass is formed as a continuous stratum comprised within the glass surface.

The method is equally applicable to the treatment of rolled glass for example patterned rolled glass, or glass sections which are rolled in continuous form and then cut into structural elements for use in the building industry.

Interior or exterior faces of articles of pressed ware can be treated; for example the exterior face of a hollow glass block can be coloured by the method of the invention by supporting the block while it is hot immediately after it is taken from the moulding machine, above a metal bar, e.g. cobalt, and directing a mixture of 5% chlorine, 0.5% oxygen, and 94.5% nitrogen through the interspace between the bar surface and the exterior face of the block. A desired blue colouration is thus achieved in the exterior face of the block.

The faces of other articles can be treated by the method of the invention, for example shaped articles such as television tube face plates can be provided with a specially treated face by the method of the invention while the glass is still hot, and before passage of the articles to an annealing lehr.

We claim:

1. A method of producing glass having desired characteristics, comprising advancing glass in ribbon form along a molten metal bath over which a protective atmosphere is maintained, regulating the temperature of the glass within a temperature range in which a hot surface of the glass at a temperature of at least 600° C. is susceptible to modification, directing a vapour of a metal compound into a treatment zone on to the hot glass surface as the glass in ribbon form is advanced along the bath and uniformly over the glass surface, supplying an oxidising agent into said metal compound vapour to provide oxidising conditions for oxidation of said metal compound, maintaining said vapour and oxidising agent in said treatment zone in non-destructive relationship with respect to the protective atmosphere, maintaining the oxidising agent in the vapour of the metal compound at a concentration in said treatment zone sufficient to promote oxidation of the metal compound substantially at the glass surface only producing a metal oxide which is dissolved into a surface layer of the glass in said treatment zone uniformly over said hot glass surface, and removing spent vapours from said treatment zone.

2. A method of producing glass having desired characteristics comprising:

advancing glass in ribbon form along a molten metal bath over which a protective atmosphere is maintained, thermally conditioning the glass to a temperature at which a hot surface thereof at a temperature of at least 600° C. is susceptible to modification, directing a metal compound in vapour form into a treatment zone on to said hot glass surface as the glass in ribbon form is advanced along the bath, supplying an oxidising agent into said metal compound vapour to provide oxidising conditions for oxidation of said metal compound, maintaining said vapour and oxidising agent in said treatment zone in a non-destructive relationship with respect to the protective atmosphere, maintaining the oxidising agent in the metal compound in vapour form at a concentration in said treatment zone sufficient to oxidise the metal compound substantially only at said hot glass surface so as to produce a metal oxide which is dissolved into that surface in said treatment zone, and removing spent vapours from said treatment zone.

3. A method according to claim 2, wherein the step of directing a metal compound in vapour form comprises: supporting a body of a metal for treating the glass in proximity to the glass surface to be treated, and directing a reactive gas across that body thereby releasing a vapour of a compound of that metal adjacent the glass surface.

4. A method according to claim 3, wherein the reactive gas is a halogen.

5. A method according to claim 2, wherein the metal is a metal of the group sodium, potassium, antimony, bismuth, lead, tin, copper, cobalt, manganese, chromium, iron, nickel, silver, silicon and titanium.

6. A method according to claim 2, wherein the metal is a metal of the group cobalt, copper and manganese, and the dissolved metal oxide produces a uniformly coloured layer in the glass.

7. A method according to claim 2 including the step of exposing the treated glass surface to a reducing atmosphere while it is still hot.

8. Apparatus for producing float glass having desired characteristics comprising; a tank structure containing a bath of molten metal over which a protective atmosphere is maintained; means for delivering glass to the bath and advancing the glass in ribbon form along the bath at a controlled rate; thermal regulators for maintaining the temperature of the glass of the temperature of at least 600° C. so as to be sufficiently hot to be susceptible to surface modification; an open-bottomed enclosure mounted just above the path of travel of the glass to delimit a treatment zone above the glass separated from the protective atmosphere; means for supplying a metal compound in vapour form into said treatment zone on to the hot glass surface within the enclosure; means for supplying an oxidising agent into the enclosure so as to maintain the oxidising agent in the vapour of the metal compound at a concentration sufficient to promote oxidation of the metal compound substantially at the glass surface only; and means for exhausting spent vapours from the enclosure; said means for supplying a metal compound in vapour form into said treatment zone comprising a bar including a metal comprised of a reactive element for treating the hot glass surface within said enclosure; said bar being shaped to define at least a portion of said enclosure and being fixed to the tank structure, and further being mounted just above and so as to extend across the path of travel of the glass along the bath; said means for supplying a metal compound in vapour form into said treatment zone further comprising reactive gas supply means mounted along one edge of said enclosure and directed so as to supply a flow of reactive gas in proximity to the interior surface of said bar and to the glass surface in said treatment zone; and said means for exhausting spent vapours comprising gas exhaust means mounted along the opposite edge of the enclosure.

9. A method according to claim 3 wherein the reactive gas is directed across said body as a mixture comprised of about 5% to 10% chlorine in an inert gas, and wherein about .00001% to 6% of oxygen gas is maintained as said oxidising agent in said treatment zone.

10. Apparatus according to claim 8 wherein the bar is a composite bar, the upstream part of which is made of said metal comprised of a reactive element for treating the glass, and the downstream part of which is made of an inert refractory material; said means for supplying an oxidising agent into the enclosure comprising a slot-shaped outlet formed in said downstream part of said bar and connected to a gas supply for delivering oxidising gas into the enclosure; and said reactive gas supply means being mounted along the edge of the upstream part of the bar.

References Cited

UNITED STATES PATENTS

| | | | |
|---|---|---|---|
| 3,306,768 | 2/1967 | Peterson | 117—106 D |
| 2,026,086 | 12/1935 | Farncomb | 117—106 D |
| 2,967,113 | 1/1961 | Liebhafsky et al. | 117—106 D X |
| 3,505,048 | 4/1970 | Plumat | 65—30 |

S. LEON BASHORE, Primary Examiner

R. L. LINDSAY, JR., Assistant Examiner

U.S. Cl. X.R.

65—60, 99 A, 182 R; 117—124 B, 124 C

UNITED STATES PATENT OFFICE
CERTIFICATE OF CORRECTION

Patent No. 3,674,453  Dated July 4, 1972

Inventor(s) D.G. Loukes et al

It is certified that error appears in the above-identified patent and that said Letters Patent are hereby corrected as shown below:

IN THE CLAIMS:

Col. 11, line 12 delete "of the" second occurrence, and insert -- at a --

Signed and sealed this 10th day of April 1973.

(SEAL)
Attest:

EDWARD M. FLETCHER, JR.
Attesting Officer

ROBERT GOTTSCHALK
Commissioner of Patents